United States Patent
Li et al.

(10) Patent No.: US 10,216,305 B2
(45) Date of Patent: Feb. 26, 2019

(54) FLEXIBLE DISPLAY PANEL AND DEVICE

(71) Applicant: WUHAN CHINA STAR OPTOELECTRONICS SEMICONDUCTOR DISPLAY TECHNOLOGY CO., LTD., Wuhan, Hubei (CN)

(72) Inventors: Shuang Li, Hubei (CN); Jian-hong Lin, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 15/735,961

(22) PCT Filed: Nov. 8, 2017

(86) PCT No.: PCT/CN2017/109822
§ 371 (c)(1),
(2) Date: Dec. 13, 2017

(65) Prior Publication Data
US 2019/0034011 A1  Jan. 31, 2019

(51) Int. Cl.
*G06F 3/041* (2006.01)
*H04N 5/225* (2006.01)

(52) U.S. Cl.
CPC ......... *G06F 3/0412* (2013.01); *G06F 3/0416* (2013.01); *G06F 2203/04102* (2013.01); *H04N 5/2257* (2013.01)

(58) Field of Classification Search
CPC ............ G06F 17/5077; H01L 23/5226; H01L 23/5283; H01L 27/0207
See application file for complete search history.

(56) References Cited

U.S. PATENT DOCUMENTS

| | | | |
|---|---|---|---|
| 2014/0152712 A1* | 6/2014 | Shishido | G09G 3/3233 345/690 |
| 2014/0192094 A1* | 7/2014 | Liao | G09G 3/3696 345/690 |

* cited by examiner

*Primary Examiner* — Insa Sadio
(74) *Attorney, Agent, or Firm* — Mark M. Friedman

(57) ABSTRACT

A flexible display panel and device are provided. Data connection touch lines bypass a camera module to electrically couple the data lines at the two sides of the camera module together. Light emitting display can be achieved in a non-display region, thereby increasing a light emitting display area of the flexible display panel.

17 Claims, 1 Drawing Sheet

FLEXIBLE DISPLAY PANEL AND DEVICE

BACKGROUND

Field

The present disclosure relates to a technological field of optical displays, and more particularly to a flexible display panel and device.

Background

With the continuous development of display technology, people's demands for display screens of terminals are higher and higher. Flexible display panels are also gradually becoming popular. The flexible display panel may be bent and curled and has the advantages of low power consumption, small size, and various display manners, and thus they are favored by people.

In a conventional flexible display panel, a substrate usually includes a display region and a non-display region. The display region has a light emitting display function. A camera device is disposed on the non-display region. Because the non-display region on which the camera device is disposed cannot implement the light emitting display function, a light emitting display area of the flexible display panel is small.

SUMMARY OF THE DISCLOSURE

The present disclosure provides a flexible display panel and device capable of increasing a light emitting display area of the flexible display panel.

An embodiment of the present disclosure provides a flexible display panel including:

A data driving chip configured to provide data signals;
A scan driving chip configured to provide scan signals;
A touch driving chip configured to provide touch signals;
A plurality of touch lines configured to transmit the touch signals;
A plurality of data lines disposed along a first direction and configured to transmit the data signals;
A plurality of scan lines disposed along a second direction and configured to transmit the scan signals;
A plurality of pixel units formed by interlacing the data lines and the scan lines;
A camera module disposed among the pixel units; and
A plurality of first contact holes and a plurality of second contact holes.

The touch lines include a plurality of data connection touch lines disposed around the camera module. One terminal of each of the data connection touch lines is electrically coupled to, via a corresponding one of the first contact holes, one of the data lines at one side of the camera module along the first direction. The other terminal of each of the data connection touch lines is electrically coupled to, via a corresponding one of the second contact holes, the one of the data lines at the other side of the camera module along the first direction.

The scan driving chip includes a plurality of first scan driving sub chips and a plurality of second scan driving sub chips. The first scan driving sub chips are configured to provide the scan signals for the scan lines at one of two sides of the camera module in the second direction. The second scan driving sub chips are configured to provide the scan signals for the scan lines at the other one of the two sides of the camera module in the second direction. The second direction is perpendicular to the first direction.

An embodiment of the present disclosure further provides a flexible display panel including:

A data driving chip configured to provide data signals;
A scan driving chip configured to provide scan signals;
A touch driving chip configured to provide touch signals;
A plurality of touch lines configured to transmit the touch signals;
A plurality of data lines disposed along a first direction and configured to transmit the data signals;
A plurality of scan lines disposed along a second direction and configured to transmit the scan signals;
A plurality of pixel units formed by interlacing the data lines and the scan lines; and
A camera module disposed among the pixel units.

The touch lines include a plurality of data connection touch lines disposed around the camera module. One terminal of each of the data connection touch lines is electrically coupled to one of the data lines at one side of the camera module along the first direction. The other terminal of each of the data connection touch lines is electrically coupled to the one of the data lines at the other side of the camera module along the first direction.

The scan driving chip includes a plurality of first scan driving sub chips and a plurality of second scan driving sub chips. The first scan driving sub chips are configured to provide the scan signals for the scan lines at one of two sides of the camera module in the second direction. The second scan driving sub chips are configured to provide the scan signals for the scan lines at the other one of the two sides of the camera module in the second direction. The second direction is perpendicular to the first direction.

An embodiment of the present disclosure further provides a flexible display device including the above-mentioned flexible display panel.

In the flexible display panel and device provided by the present disclosure, the data connection touch lines bypass the camera module to electrically couple the data lines at the two sides of the camera module together. The light emitting display can be achieved in the non-display region, thereby increasing the light emitting display area of the flexible display panel.

DETAILED DESCRIPTION OF THE PREFERRED EMBODIMENTS

Figure 1:
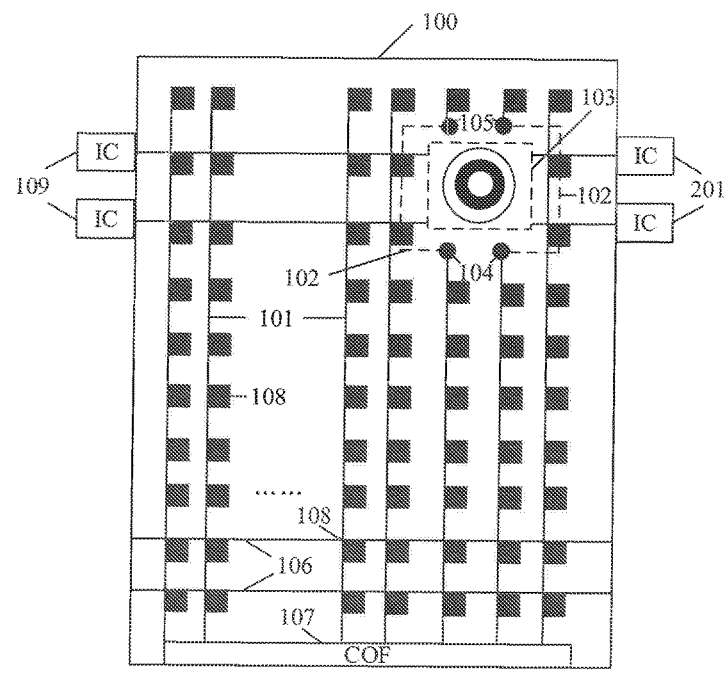
FIG. 1 illustrates a structural diagram of a flexible display panel provided by an embodiment of the present disclosure.

In the drawings, elements with similar structures are labeled with like reference numerals. A principle of the present disclosure is illustrated by an example embodied in an appropriate environment. The following description is based on an illustrated specific embodiment of the present disclosure and should not be regarded to limit other embodiments of the present disclosure which are not described herein.

The term "embodiment" used in the description refers to an example, a demonstration, or an illustration. In addition, the two indefinite articles "a" and "an" used in the description and claims are generally understood as "one" or "more/a plurality of" unless a specific single form is pointed out or is determined in the context.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

Please refer to FIG. 1. FIG. 1 illustrates a structural diagram of a flexible display panel provided by an embodiment of the present disclosure. The flexible display panel 100 in the present embodiment includes a plurality of data lines 101, a plurality of data connection touch lines 102, a camera module 103, a plurality of first contact holes 104, a plurality of second contact holes 105, a plurality of scan lines 106, a flip-chip thin film 107, a plurality of pixel units 108, a plurality of first scan driving sub chips 109, and a plurality of second scan driving sub chips 201.

The data lines 101 are disposed along a first direction and configured to transmit data signals.

The data connection touch lines 102 are disposed around the camera module 103. One terminal of each of the data connection touch lines 102 is electrically coupled to, via a corresponding one of the first contact holes 104, one of the data lines 101 at one side of the camera module 103 along the first direction. In one embodiment, each of the data connection touch lines 102 may extend to, based on the corresponding one of the first contact holes 104, the one of the data lines 101 at the one side of the camera module 103 along the first direction to be electrically coupled to the one of the data lines 101 at the one side of the camera module 103 along the first direction. The other terminal of each of the data connection touch lines 102 is electrically coupled to, via a corresponding one of the second contact holes 105, the one of the data lines 101 at the other side of the camera module 103 along the first direction. In one embodiment, each of the data connection touch lines 102 may extend to, based on the corresponding one of the second contact holes 105, the one of the data lines 101 at the one side of the camera module 103 along the first direction to be electrically coupled to the one of the data lines 101 at the one side of the camera module 103 along the first direction. Data signals at the two sides of the camera module 103 along the first direction are electrically coupled with each other via the data connection touch lines 102. As such, light emitting display can be implemented at the two sides of the camera module 103 along the first direction.

The scan lines 106 are disposed along a second direction. The second direction is perpendicular to the first direction. A scan driving chip is electrically coupled to at least one side of the scan lines 106 and configured to provide scan signals from one side of the display panel 100 to the other side of the display panel 100. The first scan driving sub chips 109 and the second scan driving sub chips 201 are electrically coupled to two sides of the camera module 103 along the second direction. The first scan driving sub chips 109 are configured to provide the scan signals for the scan lines 106 at one of the two sides of the camera module 103 in the second direction. The second scan driving sub chips 201 are configured to provide the scan signals for the scan lines 106 at the other one of the two sides of the camera module 103 in the second direction. The first scan driving sub chips 109 and the second scan driving sub chips 201 simultaneously provide the scan signals for the scan lines 106 at the two sides of the camera module 103. As such, turn-on voltages and turn-off voltages can be provided for display switches at the two sides of the camera module 103 of the flexible display panel 100 in the second direction.

In one embodiment, a data driving chip is packaged by the flip-chip thin film 107. One terminal of the flip-chip thin film 107 is electrically coupled to the data lines 101 and configured to provide the data signals for the data lines 101.

The scan driving chip provides the scan signals for the scan signals. The first scan driving sub chips 109 and the second scan driving sub chips 201 at the two sides of the camera module 103 simultaneously provide the scan signals for the scan lines 106 at the two sides of the camera module 103. The display switches electrically coupled to the scan lines 106 acquire the turn-on voltages to start a display operation. The data driving chip packaged by the flip-chip thin film 107 transmits the data signals after acquiring a start display command. The data signals of the data lines 101 at the two sides of the camera module 103 along the first direction are electrically coupled via the data connection touch lines 102. The pixel units 108 are formed by interlacing the data lines 101 and the scan lines 106. Light emitting display can be achieved in a display region and a non-display region, thereby increasing a light emitting display area of the flexible display panel 100.

Figure 2:
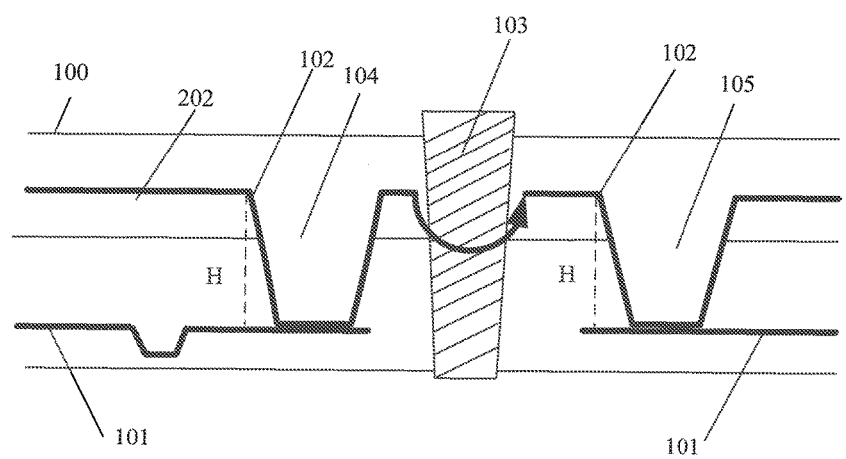
FIG. 2 illustrates a cross sectional diagram of the flexible display panel provided by the embodiment of the present disclosure.

Please refer to FIG. 2. FIG. 2 illustrates a cross sectional diagram of the flexible display panel provided by the embodiment of the present disclosure. The flexible display panel 100 includes the data lines 101, the data connection touch lines 102, the camera module 103, the first contact holes 104, the second contact holes 105, and an epoxy resin 202.

The data lines 101 are configured to transmit the data signals. The data lines 101 at one side of the camera module 103 cannot penetrate the camera module 103. As such, the data lines 101 at the other side of the camera module 103 cannot receive the data signals, and the light emitting display cannot be implemented.

The first contact holes 104 and the second contact holes 105 are formed, by a perforation technology, at the two sides of the camera module 103 along the direction of the data lines. A depth H of each of the first contact holes 104 and the second contact holes 105 is equal to a vertical distance between the data lines and the data connection touch lines 102. The data connection touch lines 102 extend to be electrically coupled to the data lines 101 via the first contact holes 104 along the direction of the data lines 101.

After the data connection touch lines 102 are electrically coupled to the data lines 101, the data connection touch lines 102 bypass one side of the camera module 103, extend to the other side of the camera module 103 opposite to the first contact holes 104, and extend to, via the second contact holes 105, the data lines 101 at the other side of the camera module 103 along the direction to be electrically coupled to the data lines 101 at the other side of the camera module 103. As such, the signals of the data lines can be transmitted from the side of the camera module 103 to the other side of the camera module 103 via the data connection touch lines 102, thereby ensuring the light emitting display at the two sides of the camera module 103.

A surface of each of the data connection touch lines 102 covers a thin film layer. The thin film layer has an insulating function and a fixing function to the data connection touch lines 102. In one embodiment, the thin film layer is the epoxy resin 202. The epoxy resin 202 has advantages of excellent chemical properties, strong adhesive force, heat resistance, and electrical insulation.

In brief, in the flexible display panel and device provided by the present disclosure, the data connection touch lines bypass the camera module to electrically couple the data lines at the two sides of the camera module together. The light emitting display can be achieved in the non-display region, thereby increasing the light emitting display area of the flexible display panel.

Despite being disclosed as one or more implementations shown and described the present disclosure, equivalent variations and modifications will occur to those skilled in the art upon reading and understanding the present specification and drawings. The present disclosure includes all such modifications and variations, and is only limited by the scope of the appended claims. Particularly, with regard to the various functions performed by the above-described components (e.g., elements, resources, etc.), the terms used to describe such components are intended to perform a function corresponding to the specified component (e.g., which are functionally equivalent) of any of the components (unless otherwise indicated), even if the structure of the implementation and execution of the function of the present disclosure shown herein is not structurally equivalent. Additionally, although a particular feature of the present disclosure has been made with respect to certain implementations, only one is open, but this feature may be as given or particular application and the purpose of enabling a desired one or more other implementations Other combinations of features. Moreover, the terms "comprising", "having", "containing", or variants thereof are used in the detailed description or the claims, and such terms are intended to be used in a manner similar to the term "comprising".

Although the present disclosure has been provided in the preferred embodiments described above, the foregoing preferred embodiments are not intended to limit the present invention. Those skilled in the art, without departing from the spirit and scope of the present invention, may make modifications and variations, so the scope of the protection of the present disclosure is defined by the claims.

What is claimed is:

1. A flexible display panel, comprising:
   a data driving chip configured to provide data signals;
   a scan driving chip configured to provide scan signals;
   a touch driving chip configured to provide touch signals;
   a plurality of touch lines configured to transmit the touch signals;
   a plurality of data lines disposed along a first direction and configured to transmit the data signals;
   a plurality of scan lines disposed along a second direction and configured to transmit the scan signals;
   a plurality of pixel units formed by interlacing the data lines and the scan lines;
   a camera module disposed among the pixel units;
   a plurality of first contact holes; and
   a plurality of second contact holes,
   wherein the touch lines comprise a plurality of data connection touch lines disposed around the camera module, one terminal of each of the data connection touch lines is electrically coupled to, via a corresponding one of the first contact holes, one of the data lines at one side of the camera module along the first direction, and the other terminal of each of the data connection touch lines is electrically coupled to, via a corresponding one of the second contact holes, the one of the data lines at the other side of the camera module along the first direction;
   the scan driving chip comprises a plurality of first scan driving sub chips and a plurality of second scan driving sub chips, the first scan driving sub chips are configured to provide the scan signals for the scan lines at one of two sides of the camera module in the second direction, the second scan driving sub chips are configured to provide the scan signals for the scan lines at the other one of the two sides of the camera module in the second direction, and the second direction is perpendicular to the first direction.

2. The flexible display panel of claim 1, wherein a depth of each of the first contact holes is equal to a vertical distance between the data lines and the data connection touch lines.

3. The flexible display panel of claim 2, wherein a depth of each of the second contact holes is equal to a vertical distance between the data lines and the data connection touch lines.

4. A flexible display panel, comprising:
   a data driving chip configured to provide data signals;
   a scan driving chip configured to provide scan signals;
   a touch driving chip configured to provide touch signals;

a plurality of touch lines configured to transmit the touch signals;

a plurality of data lines disposed along a first direction and configured to transmit the data signals;

a plurality of scan lines disposed along a second direction and configured to transmit the scan signals;

a plurality of pixel units formed by interlacing the data lines and the scan lines; and a camera module disposed among the pixel units;

wherein the touch lines comprise a plurality of data connection touch lines disposed around the camera module, one terminal of each of the data connection touch lines is electrically coupled to one of the data lines at one side of the camera module along the first direction, and the other terminal of each of the data connection touch lines is electrically coupled to the one of the data lines at the other side of the camera module along the first direction;

the scan driving chip comprises a plurality of first scan driving sub chips and a plurality of second scan driving sub chips, the first scan driving sub chips are configured to provide the scan signals for the scan lines at one of two sides of the camera module in the second direction, the second scan driving sub chips are configured to provide the scan signals for the scan lines at the other one of the two sides of the camera module in the second direction, and the second direction is perpendicular to the first direction.

5. The flexible display panel of claim 4, wherein the flexible display panel further comprises a plurality of first contact holes and a plurality of second contact holes, the one terminal of each of the data connection touch lines is electrically coupled to, via a corresponding one of the first contact holes, the one of the data lines at the one side of the camera module along the first direction, and the other terminal of each of the data connection touch lines is electrically coupled to, via a corresponding one of the second contact holes, the one of the data lines at the other side of the camera module along the first direction.

6. The flexible display panel of claim 5, wherein a depth of each of the first contact holes is equal to a vertical distance between the data lines and the data connection touch lines.

7. The flexible display panel of claim 6, wherein a depth of each of the second contact holes is equal to a vertical distance between the data lines and the data connection touch lines.

8. The flexible display panel of claim 4, wherein the second direction is perpendicular to the first direction.

9. The flexible display panel of claim 4, wherein the flexible display panel further comprises a flip-chip thin film, and one terminal of the flip-chip thin film is electrically coupled to the data lines.

10. The flexible display panel of claim 5, wherein the flexible display panel further comprises a flip-chip thin film, and one terminal of the flip-chip thin film is electrically coupled to the data lines.

11. The flexible display panel of claim 6, wherein the flexible display panel further comprises a flip-chip thin film, and one terminal of the flip-chip thin film is electrically coupled to the data lines.

12. The flexible display panel of claim 7, wherein the flexible display panel further comprises a flip-chip thin film, and one terminal of the flip-chip thin film is electrically coupled to the data lines.

13. The flexible display panel of claim 8, wherein the flexible display panel further comprises a flip-chip thin film, and one terminal of the flip-chip thin film is electrically coupled to the data lines.

14. The flexible display panel of claim 4, wherein a surface of each of the data connection touch lines covers a thin film layer.

15. The flexible display panel of claim 14, wherein the thin film layer is an epoxy resin.

16. The flexible display panel of claim 13, wherein the data driving chip is packaged by the flip-chip thin film.

17. A flexible display device, comprising the flexible display panel of claim 4.

* * * * *